D. K. ALLISON.
MACHINE FOR MIXING DOUGH.
APPLICATION FILED MAR. 26, 1920.
1,426,444.
Patented Aug. 22, 1922.
2 SHEETS—SHEET 1.
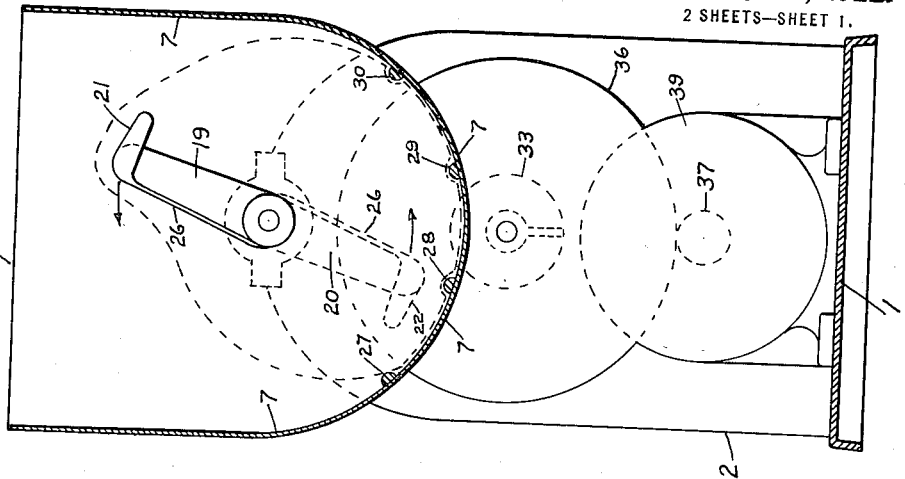
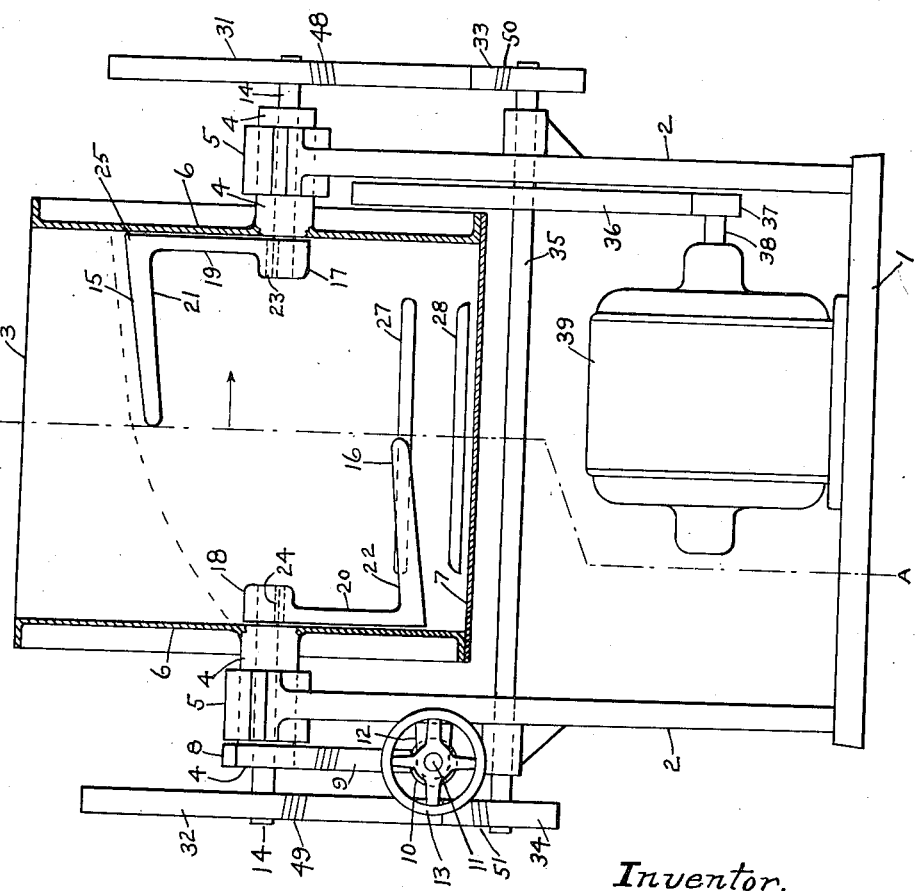
Inventor.
Daniel K. Allison

D. K. ALLISON.
MACHINE FOR MIXING DOUGH.
APPLICATION FILED MAR. 26, 1920.

1,426,444.

Patented Aug. 22, 1922.
2 SHEETS—SHEET 2.

Inventor.
Daniel K. Allison

UNITED STATES PATENT OFFICE.

DANIEL K. ALLISON, OF MILWAUKEE, WISCONSIN.

MACHINE FOR MIXING DOUGH.

1,426,444.	Specification of Letters Patent.	Patented Aug. 22, 1922.

Application filed March 26, 1920. Serial No. 368,828.

*To all whom it may concern:*

Be it known that I, DANIEL K. ALLISON, a citizen of the United States, residing at Milwaukee, in the county of Milwaukee and State of Wisconsin, have invented a new and useful Machine for Mixing Dough, of which the following is a specification.

My invention relates to improvement in machines for mixing dough employing a mixing tank containing horizontally extending rotating mixing blades and its object is to provide a machine for mixing dough having two blades which shall be independent of each other and shall act concurrently upon the dough mass so as to bring about a stretching, twisting and rolling of the fibers of the dough to effect a perfect blending of the flour and liquid content in the least possible time. While the two blades operate similarly upon the dough mass, when one is pulling through the lower part of the mass, the other is pulling through the upper part and vice versa with each half revolution of the blades. Each blade stretches a portion of the dough with each turn as it passes through, but in this stretching process the dough is not torn or cut into fragments but on the contrary, maintains one united undivided mass of dough during the mixing process. To accomplish this result the two blades are set diametrically opposite each other, the action of one blade balancing that of the other and resulting in a continuous stretching, twisting, rolling and folding process upon the dough mass.

Other objects will be pointed out in the specification and the claims.

Referring to the drawings—

Figure 1 of the drawings is an elevation of the machine with the mixing tank shown in section.

Figure 2 is a vertical cross section of the machine taken on the line A—A of Figure 1.

Figure 3 is a top view of the mixing tank, showing the mixing blades 15 and 16 in their relative positions and the cross bars 27, 28, 29 and 30.

Figure 3:
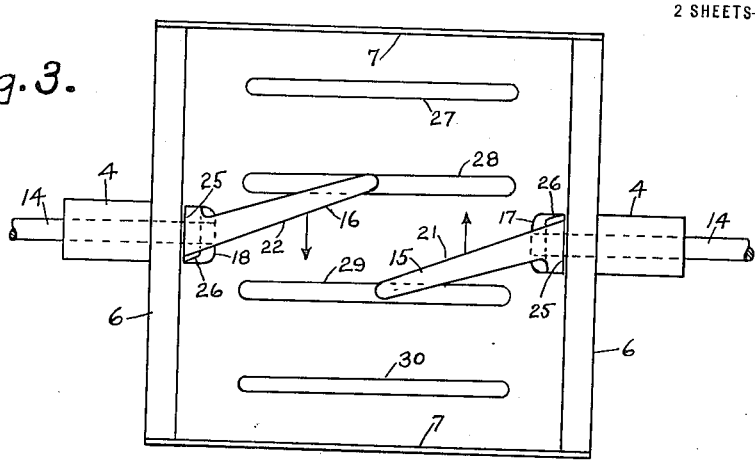

1 represents the base of the machine, supporting the legs 2—2, which are secured to the base by means of screws, bolts or in any other suitable manner. The mixing tank 3 is supported by the trunnions 4—4, in bearings 5—5 provided in the upper parts of the legs. These trunnions 4—4 are integral with the heads 6—6 of the mixing tank. A metal plate 7 is secured to the two heads 6—6 by means of bolts, rivets or any other suitable means, forming the sides and bottom of the tank. The trunnions 4 are cylindrical in shape and are mounted freely in the bearings 5—5 to tip the mixing tank through ninety degrees for the purpose of removing its contents. Secured to one of the trunnions 4, as at 8, is a worm wheel sector 9 which is operated by a worm 10.

Worm 10 is secured to a horizontal shaft 11 which is rotatably mounted in bearings 12—12 integral with one of the legs 2. Hand wheel 13 secured to shaft 11 serves as a means to rotate said worm 10 and actuate the worm wheel sector 9 to tip the mixing tank. This particular worm and sector construction is very old and well known in this and other analogous arts.

The shafts 14—14 extend through the trunnions 4—4 into the interior of the mixing tank 3 and to them at their inner ends the mixing blades 15 and 16 are respectively attached. The mixing blades are comprised of hubs 17 and 18, radially extending arms 19 and 20, and the inwardly extending mixing blades 21 and 22. The hubs 17 and 18 are splined to the shafts 14—14 by means of the keys 23 and 24.

The radial arms are constructed with flat surfaces 25—25 which work against the inner surface of the heads 6—6. The foremost edges of these flat surfaces are chamfered as at 26—26, leaving sharp edges which prevent dough from adhering to the inner surfaces of the heads 6—6.

The blades 21 and 22 are preferably of cylindrical section and taper towards their ends, being of larger section where they join the radial arms 19 and 20.

They also are set at an angle with the axis of the shafts 14—14. The line of this angle is so inclined that the portion of the blade adjacent to the radial arm is further advanced in its cycle of rotation than the innermost portion thereof. This feature applies to both blades.

The two mixing blades are set diametrically opposite each other as shown in Figures 1 and 2.

The bars 27, 28, 29 and 30 are secured to the bottom portion of the mixing tank as shown in Figures 1 and 2.

These bars are preferably of half round section and may be secured to the wall of the mixing tank in any suitable manner. In this machine I prefer to rivet and weld them to the sheet metal wall of the tank, but I do not limit myself to this construction, but wish to cover by Letters-Patent any equivalent construction, such as pressing the sheet metal wall of the tank into such shape or indenting the same, or the insertion of an inner wall with pressed ribs or any means within the tank which serves to retard the movement of the dough mass and thereby cause it to roll on the bottom of the tank and to prevent it from slipping on the bottom or side walls of the tank. The gears 31 and 32 are keyed to the shafts 14—14 and drive the same. The pinions 33 and 34 are keyed on opposite ends of the shaft 35 and serve to drive the gears 31 and 32. The teeth of the pinions 33 and 34 are cut on an angle, as indicated at 50 and 51 in Figure 1, with the axis of shaft 35, which angles are inclined oppositely. It will also be noted that the teeth of the gears 31 and 32 are cut on an angle with the axis of their shafts 14—14 as indicated at 48 and 49, which angles are inclined oppositely in the two gears. When these gears 31 and 32 rotate the angles of their teeth cause end thrusts in shafts 14—14 and for that reason the angles are cut with opposite inclination, the thrusts on the two shafts are exerted in opposite directions which serve to keep the radial arms 19 and 20 of the two mixing blades close against the inner walls of the two tank heads 6—6. The gear 36 is keyed to the shaft 35 and drives said shaft. The pinion 37 is keyed to the shaft 38 of the electric motor 39. The machine operates as follows:— Flour and water and other ingredients are placed in their proper proportions in the mixing tank and power is applied to the motor 39, which through the gearing 37, 36, 33, 31, 34 and 32, the mixing blades 15 and 16 are caused to rotate in the direction indicated by the arrows in Figures 2, 3 and 4. When one of the mixing blades, as 16, is working through the lower part of the dough mass, the other one, as 15, is working the upper part of the mass. The two blades 15 and 16 operate alike upon its portion of the dough mass; but alternately. While moving through the dough mass each blade engages a portion of the dough and pulls and stretches the fibers thereof. This action takes place at one end of the tank during the half rotation of the blades and then at the other end during the next half rotation. It is essential to effect this new process of mixing that the dough mass as a whole should rotate within the tank at about one half of the velocity of the mixing blades. That is, the whole mass should turn over one half revolution for each revolution of the blades. This relative movement permits the blades to operate upon new portions of the dough with each turn. The dough mass has a natural tendency to whirl around with the blades at the same velocity as that of the blades and the bars 27, 28, 29, and 30 are used to retard this whirling movement of the mass, which results in the dough mass revolving at a velocity approximately one half of that of the blades.

It is the pulling action of the blades within the dough mass, partly counteracted by the bars 27, 28, 29, and 30 which causes the dough mass as a whole to rotate at the proper velocity.

The angular inclination of the blades 21 and 22 serves to force the dough toward the center of the tank and keeps it away from the heads 6—6 while being mixed. This action also serves to centralize the mass which expedites the mixing process.

Figure 4:
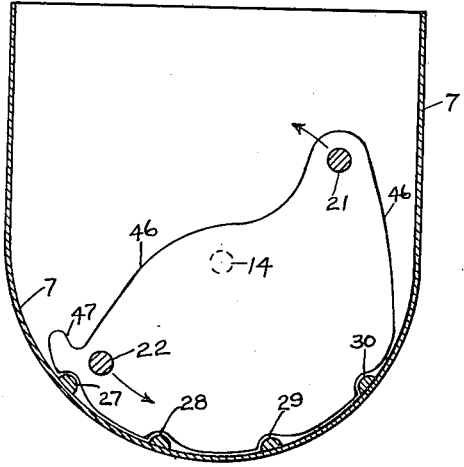
Figure 4 is a vertical cross section through the mixing tank 3 showing the dough mass as it appears in the process of mixing.

The cross bars 27, 28, 29 and 30 shown in Figures 2, 3 and 4 serve to keep the dough mass from slipping upon the bottom of the tank when the blades 21 and 22 are moving over them. By reason of this, the blades while working through the dough communicate to that portion of the dough mass lying upon the bottom of the tank a rolling movement.

Figure 5:
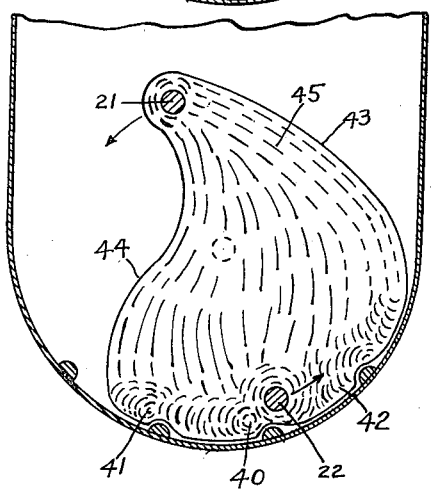
Figure 5 is a view similar to Figure 4 with the mixing blades shown further advanced.

The broken curved lines shown in Figure 5 at 40, 41 and 42 are intended to illustrate this rolling action of the dough. 43 and 44 show the approximate outline of the dough mass while the same is being mixed. The outline of the dough mass changes as the mixing blades assume different positions and is shown in Figure 4 at 46—46 as it appears when blade 22 passes over cross bar 27. Further movement of blade 22 will cause the lobe 47 of the dough mass to roll over cross bar 27. The straight broken lines 45 in Figure 5 represent the dough fibers as being stretched by the pulling action of the blade 21.

By the alternate stretching and rolling the fibers of the dough mass, first at one end of the tank and then at the other end, oppositely positioned portions of the whole mass are being stretched, rolled and twisted simultaneously and for every half revolution of the blades this process is alternated at opposite ends of the mass, thus effecting very speedily a thorough blending of the flour with the moisture content.

It will be noted that the blades extend but half the length of the tank, and by reason thereof, they do not lift the mass off the bottom of the tank while rotating. In furtherance of this object the tank is made shorter in length than the diameter thereof.

It is important in order to promote the greatest efficiency in this new process of mixing dough that the mixing blades be short, so that they will pull through the mass without offering any tendency toward lifting the dough off the bottom of the tank, thereby promoting the rolling of the dough upon the bottom of the tank.

What I claim and wish to secure by Letters-Patent is:—

1. In a machine for mixing dough the combination of a tank or receptacle for containing the dough mass, mixing blades of cylindrical cross sections mounted independent of each other and projecting inwardly from the ends of the tank and rotating in the same direction, a common shaft outside the tank, drive means connecting the mixing blades to said common shaft and power means for rotating said shaft.

2. In a machine for mixing dough, the combination of a tank or receptacle for holding the dough mass, a pair of rotating blades of cylindrical cross sections mounted upon separate shafts at opposite ends of said tank and positioned diametrically opposite each other, with means for rotating said blades concurrently in the same direction.

3. In a machine for mixing dough the combination of a tank or receptacle for containing the dough, mixing blades of cylindrical cross sections rotating concurrently in the same direction mounted upon separate shafts at opposite ends of said tank and positioned diametrically opposite each other and having a circuit of motion of less radius than that of the tank, with means fixed to the inner wall of the tank to engage the surface of the dough to retard its rotating velocity in the process of mixing.

4. In a machine for mixing dough a mixing tank or receptacle, blades rotating within the tank and arranged to pull through the dough mass and thereby communicate rotating motion thereto, and cross bars secured to the inner surface of the tank and arranged to engage the outer surface of the dough mass and retard its motion to a velocity less than that of the blades.

5. In a machine for mixing bread dough a tank or receptacle for containing the dough mass, rotating means within the tank for stirring the dough and imparting rotating motion thereto, and means fixed to the inner wall of the tank to impede said rotating motion to enable said rotating means to engage new portions of the mass with each rotation.

6. In a machine for mixing bread dough a receptacle for containing the dough mass, rotating blades within the receptacle and retarding means fixed to the inner surface of said receptacle cooperating with said rotating blades by which the dough mass is rotated and its fibers pulled and stretched with each rotation of the blades without causing division of the mass.

7. In a machine for mixing bread dough the combination with a tank or receptacle, of a pair of radial arms rotating in the same direction and located within said receptacle at opposite ends thereof and arranged to scrape the ends of said receptacle and extending from the axis of rotation in diametrically opposite directions, cylindrical mixing blades extending horizontally from the outer ends of said radial arms toward the central portion of said receptacle, and means for driving said radial arms and mixing blades concurrently.

8. In a machine for mixing dough the combination of a tank or receptacle for containing the dough mass, rotating blades mounted independently upon separate shafts, driven gears fixed to said shafts and drive pinions for imparting rotating motion to said driven gears and oppositely directed end thrust to said shafts.

9. In a machine for mixing dough the combination of a tank or receptacle for containing the dough mass, rotating blades mounted independently upon separate shafts, driven gears fixed to said shafts, and drive pinions fixed to a common drive shaft, the gear teeth being helical with opposite angles to cause oppositely directed end thrust to the driven gears.

10. In a machine for mixing dough the combination of a mixing tank, mixing devices comprising a pair of radial arms, one for each end of the tank extending in diametrically opposite directions and being mounted on separate shafts, and mixing blades of cylindrical cross sections, extending inwardly from the ends of the arms and inclined oppositely to force the dough mass toward the center of the tank.

DANIEL K. ALLISON.